United States Patent [19]
McConnell

[11] Patent Number: 5,112,158
[45] Date of Patent: May 12, 1992

[54] UNDERGROUND PIPE REPLACEMENT METHOD AND APPARATUS

[76] Inventor: W. Harry McConnell, P.O. Box 751803, Houston, Tex. 77275-1803

[21] Appl. No.: 675,635

[22] Filed: Mar. 25, 1991

[51] Int. Cl.$^5$ .......................... F16L 1/00; F16L 55/00
[52] U.S. Cl. .................................. 405/154; 166/55; 405/184; 405/156
[58] Field of Search ............... 425/154, 156, 184; 166/55, 55.3, 361, 55.1, 55.2, 55.6; 138/97, 98; 30/92.5, 92; 83/178, 188

[56] References Cited

U.S. PATENT DOCUMENTS

| | | | |
|---|---|---|---|
| 4,507,019 | 3/1985 | Thompson | 405/154 |
| 4,738,565 | 4/1988 | Streatfield et al. | 405/154 |
| 4,848,964 | 7/1989 | Yarnell | 405/154 |
| 4,925,344 | 5/1990 | Peres et al. | 166/55 |
| 4,930,542 | 6/1990 | Winkle et al. | 138/98 |

Primary Examiner—Dennis L. Taylor
Attorney, Agent, or Firm—William E. Shull

[57] ABSTRACT

Underground frangible pipe replacement apparatus and methods for replacing an existing unserviceable pipe by first crushing the existing pipe entirely inwardly, or imploding it, to destroy it. The resulting shards are then forced outwardly into the surrounding soil, creating a bore large enough to accommodate a replacement pipe at least as large as, or large than, the old pipe. The new pipe is pulled into place substantially simultaneously with the expansion of the bore. The crushing tool includes a generally tubular main body and a plurality of longitudinally extending, tapered blades circumferentially disposed about the ID of the main body of the crushing tool. The blades taper outwardly and forwardly from near the midportion of the crushing tool. The crushing tool has a connecting rod at its center, including means for connecting the crushing tool to a motive force at one end and means for connecting the crushing tool to the expanding plug at the other end. A plurality of bell-engaging knuckles are disposed around the ID of the main body of the crushing tool between the blades. The rear end of the crushing tool is tapered inwardly and rearwardly. The expanding plug connects to the trailing end of the crushing tool, and includes a conical nose for expanding the crushed pipe fragments into the surrounding soil. The plug is pulled through the ground behind and along with the crushing tool, pulling with it the new pipe.

19 Claims, 2 Drawing Sheets

UNDERGROUND PIPE REPLACEMENT METHOD AND APPARATUS

BACKGROUND OF THE INVENTION

1. Field of the Invention

The present invention relates generally to the replacement of underground pipes, and more particularly to methods and apparatus for replacing fracturable pipes with new pipes which may be of the same size as, or larger than, the old pipes. Still more particularly, the present invention relates to methods and apparatus for replacing existing sewer pipes, water pipes, gas mains, or the like by first crushing the existing pipes inwardly to destroy them, then forcing the debris or shards of the destroyed pipe outwardly into the surrounding earth or other environment to form a bore of the appropriate size, and finally pulling the replacement pipe into the bore.

2. Background Art

It is often necessary to repair or replace underground pipes which have lost their fluid-carrying capacity or integrity for example through age, the actions of corrosive substances, or the effects of other deleterious conditions or hazards. One reason why repair or replacement is sometimes necessary is to prevent the leakage of the fluid into the surrounding earth or other environment. Such leakaqe could lead to contamination of the surrounding soil or subterranean potable water sources or supplies, for example in the case of underground sewer lines, or to contamination of the fluids carried within the underground pipes, for example in the case of underground water lines. Such leakage could also lead to potentially violent destructive conditions, placing property, health, or even lives imminently at risk, for example in the case of underground gas mains. If an underground natural gas main were to become corroded away, for example, allowing the gas to escape from the main, that could lead to an unwanted and potentially explosive accumulation of gases in a subterranean reservoir or other formation, or even in a building or other structure.

Another reason why repair or replacement is sometimes necessary is to restore the fluid-carrying capacity of the underground pipes. A sewer line which has become badly decomposed or broken up, for example, often cannot carry the volume of material for which it was designed. This can lead to temporary backups in the event the sewer system becomes deluged by an unusual event, such as a large storm, or eventually to complete blockages.

On technique used in the past for repairing or replacing underground pipes has been to excavate from above to provide access to the old pipes. Once excavated, the old pipes may be repaired or replaced as desired, and new pipes installed in place of the old ones, again as desired. This technique is usually time-consuming and expensive, however, involving as it does the duplication of effort in creating a new excavation at a site previously excavated, and for other reasons affecting the cost of the new excavation such as the depth at which the pipes are located, the subterranean environment of the pipes, and the surface conditions above the pipes. Sometimes this technique is unavailable as an option in a particular case even if desired, for example due to the presence of a surface structure such as a building through which an excavation cannot proceed.

One method of repairing underground pipes to keep them in service without completely excavating the pipes has been to install a liner within the pipes where necessary to restore the fluid-carrying integrity of the pipes. The sewer lines or the like can be viewed internally with remote television equipment to determine where the liners are necessary. The major problem with the so-called "slip lining" technique is that the liners have a smaller internal diameter ("ID") than the original pipes, thus reducing the capacity of the pipes. For example, an 8" ID pipe when lined may have an ID of only 6".

Another technique used in the past for replacing underground pipes has been to cut or slit them longitudinally by pulling a cutting tool through the pipes; expanding the resulting segments outwardly with an expanding tool, which may also comprise the cutting tool, to make room for the new pipe; and pulling the new pipe into the space thus created, typically behind and along with the expanding or expanding/cutting tool. Such a technique is useful particularly for pipes made of materials such as steel which do not normally fracture into irregularly-shaped pieces or shards when engaged by a blow or like impact. These techniques may be used to replace an old pipe with one of an equal or larger diameter, if desired. An example of this type of technique is disclosed in U.S. Pat. No. 4,903,406 to Schosek et al. That patent discloses a pipe splitter having a cutting wheel adapted for cutting a pipe, such as a black iron pipe, along a single longitudinal path when pulled through the pipe. An expander may be pulled through the split pipe for spreading the pipe apart, and anew pipe pulled into place trailing the expander. Another example of this type of technique is disclosed in U.S. Pat. No. 3,181,302 to Lindsay. The Lindsay apparatus is adapted to spit or cut the existing pipe longitudinally at two locations, for example into two halves, rather than at one location as in the Schosek '406 patent. Examples of other devices used in the past for cutting, ripping, or splitting pipes, casing, tubing, or the like are found in U.S. Pat. Nos. 642,367; 1,001,205; 1,519,882; 1,618,368; 2,502,711; 2,638,165; 2,834,106; 2,947,253; 2,983,042; and 3,023,040.

Another technique used in the past for replacing underground pipes with the same or larger diameter pipes, if desired, has been to burst them from the inside by pulling or pushing a bursting tool through the pipes; expanding the resulting pipe fragments outwardly with an expanding tool, which may also comprise the bursting tool, to make room for the new pipe; and pulling the new pipe into the space thus created, typically behind and along with the expanding or expanding/bursting tool. Such a technique is useful particularly for pipes made of materials such as concrete, tile, or cast iron, which normally fracture into irregularly-shaped pieces or shards when engaged by a blow or like impact. An example of a system utilizing this type of technique is disclosed in U.S. Pat. Nos. 4,505,302, 4,720,211, and 4,738,565 to Streatfield et al. The pipe bursting tool of the Streatfield patents is adapted to engage the interior to burst it, and to force the pipe fragments outwardly around the circumference of the tool to create a space for the new pipe, at least a portion of the outward forcing of the pipe fragments occurring at the same time the pipe is destroyed by the outwardly directed fracturing or bursting action.

U.S. Pat. No. 4,507,019 to Thompson discloses another pipe replacement system of the latter type, including a power system for imparting rotation as well as linear movement to an expansion and replacement mandrel as it is moved through the old pipe. The expansion and replacement mandrel of the Thompson system includes a plurality of hard metal boring buttons of a material such as tungsten carbide to score the internal surface of the existing pipe as the mandrel is rotated and forced through the pipe. The Thompson system, like the Streatfield system, engages the ID of the existing pipe to destroy it b initially fracturing it outwardly, i.e., by bursting it. The Streatfield and Thompson patents all disclose expanding the pipe fragments radially outwardly to create a large enough space for pulling in a replacement pipe of the same or larger diameter behind, and along with, their respective bursting tools.

Other systems of this type for replacing an existing pipe, that is, systems relying on bursting the existing pipe from the inside, are disclosed in U.S. Pat. No. 4,634,313; 4,648,746; 4,674,914; 4,693,404; 4,732,222; and 4,767,236.

Another technique for renewing an existing pipeline is disclosed in U.S. Pat. No. 4,886,396 to Akesaka. Akesaka discloses apparatus and methods for advancing a shield tunneling machine from one end of the existing pipeline to the other, thereby excavating the existing pipeline with rotating cutters, and placing a new pipeline in the excavated spot while the machine is advanced. The shield tunneling machine of Akesaka may have a diameter larger than the diameter of the existing pipe, so it may excavate not only the existing pipe but also some of the surrounding ground.

A self-propelled pneumatic burrowing device is disclosed in U.S. Pat. No. 4,100,980 to Jenne. The Jenne device includes an axially reciprocating percussion plunger disposed inside a tubular casing so as to strike a percussion head at the forward end of the casing, thereby advancing the device through the ground by crushing and/or displacing the material in the path of the device.

SUMMARY OF THE INVENTION

The present invention comprises simple and effective means and methods for replacing existing underground pipes by first crushing the existing pipes inwardly to destroy them rather than by bursting them outwardly o cutting or splitting them from the inside, or excavating them through the rotary cutting action of a tunneling machine, as in the prior art systems discussed above. The crushing means of the present invention includes a crushing tool which is pulled along a pathway defined by the existing pipes, imploding the existing pipes as the crushing tool proceeds along the pathway. The present invention also includes expanding means for forcing outwardly, in directions transverse or radial to the longitudinal axes of the pipes, the fragments or shards of the old pipes thus destroyed. The fragments or shards are forced into the surrounding ground to form a bore which may be sized, by using an appropriately sized expanding means, to permit replacement of the old pipes with new pipes of the same size as, or larger than, the old pipes. The expanding means is pulled through the ground along the direction of the pathway followed by the crushing means, preferably attached to the trailing end of the crushing means. The new pipes are attached to the trailing end of the expanding means and pulled into the bore formed by the expanding means as the expanding means is pulled through the ground.

The crushing tool of the present invention includes a generally tubular main body with an ID greater than the outside diameter ("OD") of the existing pipes. An end of an existing pipe is received within the ID of the main body of the crushing tool, and the crushing tool is then pulled along the exterior of the existing pipe. An axially extending connecting rod having connecting means on its front and rear ends is centrally disposed within the main body. The connecting means at the front end of the connecting rod is adapted for connecting the present invention to a means for pulling the invention along the pathway of the existing pipe and through the ground, such as a cable attached to a winch, or a hydraulic boring system or the like.

The main body of the crushing tool also includes in its interior a plurality of circumferentially spaced apart, longitudinally extending blades connected at their radially inner ends to the central connecting rod and at their radially outer ends to the ID surface of the main body. Each blade includes a pipe engaging leading edge which tapers from the central connecting rod near the midportion of the main body toward the ID of the main body in a direction toward the front end of the crushing tool. The crushing tool also preferably includes a plurality of radially inwardly extending, circumferentially spaced apart knuckles disposed on the ID of the main body between the blades, and preferably forward of the frontmost portions, i.e., the radially outermost portions, of the pipe engaging edges of the blades. The knuckles preferably extend radially inwardly a distance sufficient to engage the exterior surfaces of any outwardly extending flanges, bells or other connecting portions or joints of the existing pipes initially to fracture them, but preferably a distance short of permitting their engagement with the exterior surfaces of the conduit sections, i.e., the pipe sections between joints, of the existing pipes.

The leading edge of the main body of the crushing tool is tapered in a manner which in cross-section resembles that of the blades, thereby providing a substantially sharp leading edge for enabling the crushing tool to better cut through the ground. The circumferential periphery of the main body at its trailing end is provided with an inwardly and rearwardly extending taper. The rear tapered portion of the main body may preferably comprise a plurality of relatively short slits or cuts which extend through the wall of the main body in a longitudinal direction from the rear terminal end thereof. The slits may thus define short body segments between them, the body segments then preferably being bent inwardly around the circumference of the tool in order to form the taper.

The rear edges of the blades of the crushing tool may each be provided with a plurality of tabs bent alternately toward one or the other of the longitudinally extending flat faces of the blades into positions substantially normal to the longitudinal axis of the crushing tool.

The expanding means of the present invention includes a plug having generally circular cylindrical main body and a conical or frustoconical-shaped leading or nose portion, which may be integral with the main body of the plug, comprising the leading and expanding face of the expanding means. The leading end of the conical or frustoconical-shaped, tapered nose portion has an OD preferably smaller than the ID of the main body of the crushing tool. The tapered nose portion of the plug expands in OD toward its rear end and should have an OD at that rear end at least as large as the OD of the new pipe which is to be installed. A connecting rod is disposed at the front terminal end of the plug for attaching the plug, for example through swivel joint means or the like, to the connecting means at the rear end of the central connecting rod of the main body of the crushing tool.

The rear portion of the main body of the plug has attached thereto a tail piece, which may comprise, for example, a tubular sleeve or the like extending longitudinally from the main body of the plug, having means for attaching the leading end of the new pipe which is to be pulled into the bore formed by the expanding cone or nose piece of the plug. The OD of the main body of the plug is preferably about the same as that at the greatest extent of the conical nose piece, in order to prevent the pipe shards or fragments or other debris which has been expanded outwardly by the expanding means from collapsing inwardly before the new pipe can be pulled into place.

As the shards or fragments of the old, imploded pipe traverse the interior of the crushing tool from front to rear between the blades, they may tend to become mixed with soil or other debris which has been cut by the crushing tool as it moves along the existing pipe or which has accumulated in the interior of the existing pipe. The knuckles on the ID of the crushing tool and the tabs at the rear edges of the blades may assist in this mixing action, thus helping to obtain a more uniform character of the material discharged from the rear end of the crushing tool.

The present invention may be used to crush or implode in situ and replace frangible underground pipes, that is, those pipes which may be fractured into irregular shards or fragments by the action of the crushing tool of the present invention. Such pipes may be made of materials such as concrete, tile, vitrified clay ("VC"), or cast iron, and include pipes known in the art as truss pipe (a "sandwich" of plastic, cement or concrete, and plastic) and soil pipe (a pipe of metal which is not as thick or strong as that used in cast iron pipe, and which typically can be broken with the force of a hammer blow or the like). The present invention may also be used to replace PVC sewer pipe.

The present invention will typically be used to replace frangible pipe of the types referred to herein, but may be found useful to replace other types of pipes in accordance with the broader teachings of the disclosure. The replacement pipe will typically be PVC pipe or the like because of its many desirable properties, but of course other types of replacement pipes will no doubt be found useful.

The motive force for pulling the crushing tool along the exterior of the existing pipe may be provided, as indicated above, by a cable attached at one end to the front end of the crushing tool and at the other end to a winch on a truck or other mobile pulling machine. Another alternative for providing the motive force is use of a hydraulic boring system or the like, for example a system which enables threaded rods to be inserted into the existing pipe from one end thereof, pushed through the existing pipe (rod sections being added by threading them together as necessary) to the other end, attached to the front end of the crushing tool, and pulled back through the existing pipe at great force with the assistance of force amplification through hydraulic cylinders. Typically, an excavation will have to be made at the end of the pipe where the motive force application means is located in order to accommodate such means, and another excavation will have to be made at the other end of the pipe to allow the crushing tool to be placed around the pipe.

It is therefore an object of the present invention to provide underground frangible pipe replacement apparatus and methods for first crushing an existing pipe of this type entirely inwardly to destroy it, and then forcing the shards or fragments outwardly to create a new pipe receiving bore at least as large as that required to replace the old pipe with a new one of the same size as the old pipe, or larger than the old pipe, as desired.

It is also an object of the present invention to provide such pipe replacement apparatus and methods which enable the new pipe to be pulled into the bore behind the expanding means, as the expanding means progresses through the ground behind the crushing means. It is another object of the present invention to provide such pipe replacement apparatus and methods which accomplish the foregoing without rotating the crushing means.

It is also an object of the present invention to provide such pipe replacement apparatus and methods which enable the expanding means to rotate, along with the new pipe, as the crushing means is pulled along the pipe without rotation.

It is another object of the present invention to provide such pipe replacement apparatus and methods which are simple and easy to use, reliable, and economical.

BRIEF DESCRIPTION OF THE DRAWINGS

These and other objects and advantages of the present invention will become apparent as the following detailed description of preferred embodiments thereof is read in conjunction with reference to the accompanying drawings, wherein.

DETAILED DESCRIPTION OF THE PREFERRED EMBODIMENTS OF THE INVENTION

Figure 1:
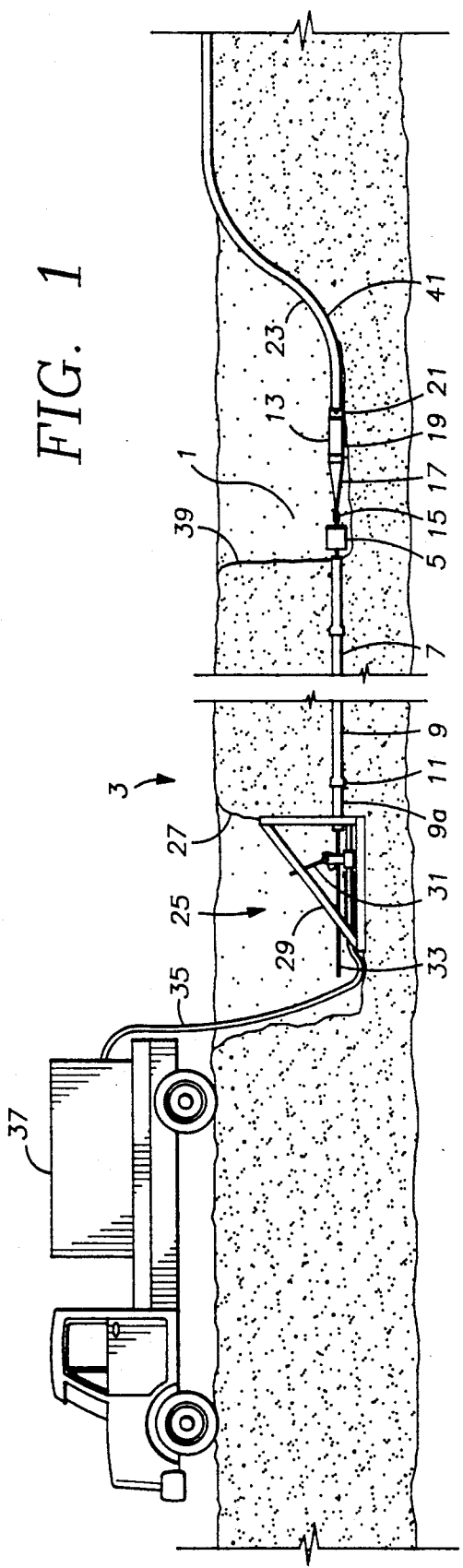
FIG. 1 is a fragmentary view, partly in elevation and partly in vertical section, of a preferred embodiment of the underground pipe replacement apparatus of the invention in place at a job site, with the crushing tool about to be moved into place around the end of an existing pipe to be replaced, and prior to the crushing tool being pulled along the existing pipe.

Referring initially to FIG. 1, there is shown a preferred embodiment of the underground pipe replacement apparatus of the invention, indicated generally at 1, in place at a job site 3, with the crushing tool 5 about to be moved longitudinally axially into place around the end of an existing pipe 7 to be replaced. FIG. 1 illustrates the apparatus of the invention just prior to the crushing tool 5 being pulled along the existing pipe 7. The existing pipe 7 may comprise, for example, a water line, sewer pipe, gas main, or the like. Existing pipe 7 is preferably made of a frangible material such as concrete, tile, vitrified clay, cast iron, truss pipe or soil pipe material, or the like, and is thus preferably capable of being broken or fractured inwardly into a plurality of irregularly shaped shards or fragments by an externally applied crushing or imploding force. The existing pipe 7 may be partially corroded away or otherwise damaged, as by the corrosive effects of sewer gases against the upper portions of concrete sewer pipes. The existing pipe 7 may include a plurality of conduit sections 9 having a raised bell or flange 11 at one end for receiving the free end of the next succeeding conduit section 9a. The apparatus of the present invention also includes an expanding plug 13 connected to the trailing end of the crushing tool 5, as by means of a universal joint or swivel joint 15. The expanding plug 13 includes a conical or frustoconical-shaped expanding nose 17 on its front end, a cylindrical main body 19 behind the nose, and a tail piece 21 at its trailing end. Attached to the tail piece 21 is a new pipe 23 of PVC or the like, to be installed by the apparatus of the invention in a bore formed by the expanding plug 13.

A known hydraulic boring system 25 is disposed at the other end of the pipe to be replaced, that is, at the end of the existing pipe opposite to that adjacent the crushing tool 5. The hydraulic boring system 25 is disposed in an excavated pit 27, preferably at substantially the same level or depth as the pipe to be replaced. The system 25 includes a frame 29 for providing support and reactive force bracing means, a gripper 31 for sequentially engaging a plurality of lengths 33 of end-threaded rods, and a hydraulic line system 35 for supplying the system 25 with hydraulic fluid. A truck 37 provides power to run the system 25, which enables the rods 33 to be pulled or pushed axially through the existing pipe 7 with great force. Another excavation 39 is provided at the end of the pipe 7 where crushing is to begin. The rear side of the excavation 39 is more gently sloped, as at 41, than is the front end in order to accommodate the new pipe, which may be draped in the hole 39 prior to being pulled into place in the ground. The gentler the slope 41, the less stress placed on the new pipe.

Figure 5:
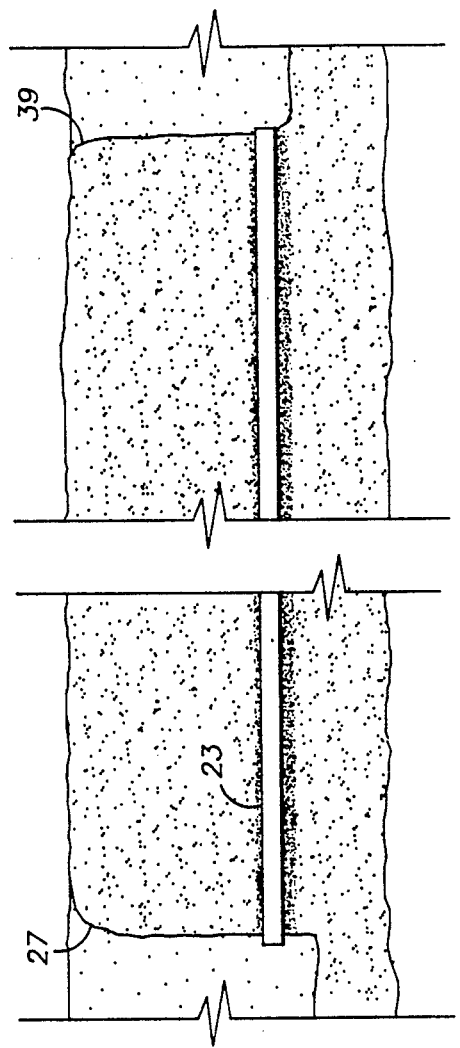
FIG. 5 is a fragmentary view, partly in elevation and partly in section, of a new pipe disposed in the bore formed by the expanding plug of the present invention along the pathway defined by the old or previously existing pipe.

When the hydraulic system 25 is actuated, gripper 31 is made by an operator to engage the rods 33 one by one or in turn, and the hydraulic power is used to push or pull, as the case may be, the rods through the pipe 7 from pit 27 to pit 39 and back again, the return trip being accompanied by the crushing tool 5, the expanding plug 13, and the new pipe 23. Once the entire new pipe 23 is in place, for example as shown in FIG. 5, the truck 37, the hydraulic system 35, 25, and the apparatus of the present invention are moved to a new job site 3 for further or additional work on the same or a different pipeline. As indicated above, the force needed to pull the crushing tool 5 through the pipe 7 may be supplied, for example, by a winch operated from truck 37, or the like. Additional and varied force application means will no doubt be found useful in the present invention.

Figure 2:
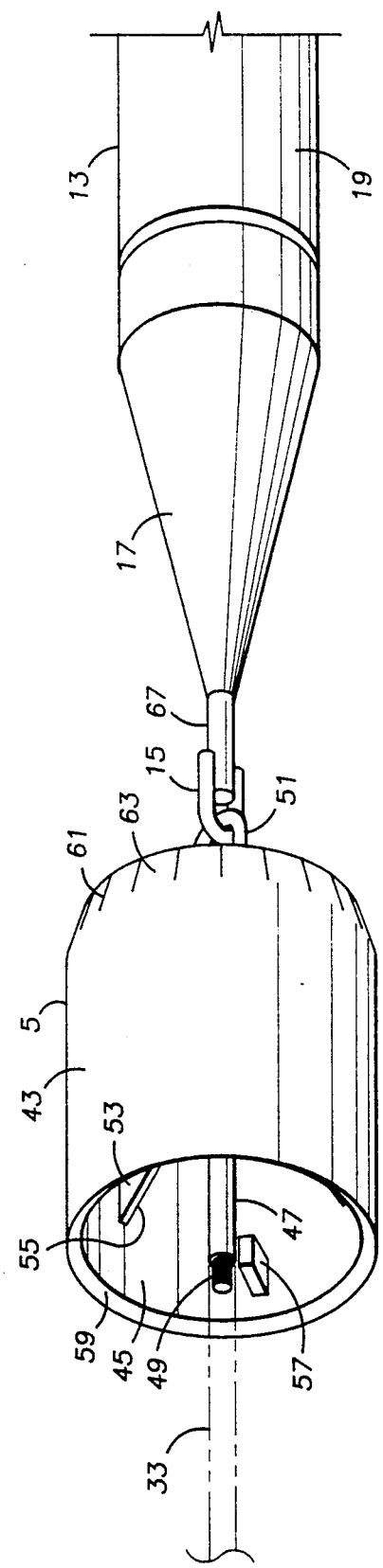
FIG. 2 is side frontal pictorial view of the crushing tool and the front portion of the expanding plug of the embodiment of the invention shown in FIG. 1, including the tapered nose portion of the expanding plug.

Referring to FIG. 2, the crushing tool 5 and the front conical nose portion 17 of the expanding plug 13 of the present invention are shown in greater detail. The crushing tool 5 of the present invention includes a generally tubular main body 43 with an ID 45 greater than the outside diameter ("OD") of the existing pipes 9, 11. An end of an existing pipe 9, is received within the ID 45 of the main body 43 of the crushing tool, and the crushing tool is then pulled along the exterior of the existing pipe. An axially extending connecting rod 47 having connecting means 49, for example a threaded pin or box, disposed on its front end and connecting means 51, for example a swivel link joint, disposed on its rear end is centrally disposed within the main body 43. The connecting means 49 at the front end of the connecting rod 47 is adapted for connecting the present invention to a rod 33, a cable, or the like for pulling the crushing tool 5 along the pathway of the existing pipe and through the ground.

The main body 43 of the crushing tool also includes in its interior a plurality of circumferentially spaced apart, longitudinally extending blades 53 connected at their radially inner edges to the central connecting rod 47 and at their radially outer edges to the ID surface 45 of the main body 43. Each blade includes a pipe engaging leading edge 55 which tapers from the central connecting rod 47 near the midportion of the main body 43 toward the ID 45 of the main body in a direction toward the front end of the crushing tool 5. The crushing tool also preferably includes a plurality of radially inwardly extending, circumferentially spaced apart knuckles 57 disposed on the ID 45 of the main body between the blades 53, and preferably forward of the frontmost portions, i.e., the radially outermost portions, of the pipe engaging edges 55 of the blades. The knuckles 57 preferably extend radially inwardly a distance sufficient to engage the exterior surfaces of any outwardly extending flanges, bells or other connecting portions or joints 11 of the existing pipes initially to fracture them, but preferably a distance short of permitting their engagement with the exterior surfaces of the conduit sections, i.e., the pipe sections between joints, of the existing pipes.

The leading edge 59 of the main body of the crushing tool is tapered in a manner which in cross-section resembles that of the blades 53, thereby providing a substantially sharp leading edge for enabling the crushing tool 5 to better cut through the ground. The circumferential periphery of the main body 43 at its trailing end is provided with an inwardly and rearwardly extending taper. The rear tapered portion of the main body 43 may preferably comprise a plurality of relatively short slits or cuts 61 which extend through the wall of the main body 43 in a longitudinal direction from the rear terminal end thereof. The slits may thus define short body segments 63 between them, the body segments 63 then preferably being bent inwardly around the circumference of the tool 5 in order to form the taper.

Figure 4:
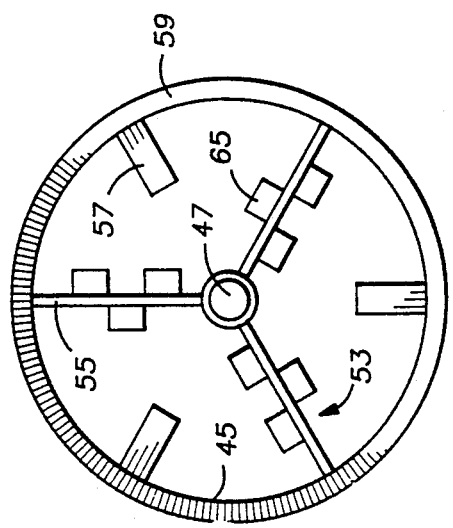
FIG. 4 is a front end view of the crushing tool of FIGS. 1-3.

The rear edges of the blades 53 of the crushing tool 5 may each be provided with a plurality of tabs 65 (FIG. 4) bent alternately toward one or the other of the longitudinally extending flat faces of the blades 53 into positions substantially normal to the longitudinal axis of the crushing tool.

The crushing tool of the present invention is preferably made substantially entirely of steel or the like.

Expanding plug 13 has a generally circular cylindrical main body 19 and a conical or frustoconical-shaped leading or nose portion 17, which may be integral with the main body 19 of the plug 13, nose portion 17 comprising the leading and expanding face of the expanding means. The leading end of the conical or frustoconical-shaped tapered nose portion 17 has an OD preferably smaller than the ID 45 of the main body of the crushing tool. The tapered nose portion of the plug expands in OD toward its rear end and should have an OD at that rear end at least as large as the OD of the new pipe 23 which is to be installed. A connecting rod 67 is disposed at the front terminal end of the plug 13 for attaching the plug, for example through a swivel joint means or the like, to the connecting means 51 at the rear end of connecting rod 47 of the main body of the crushing tool.

The rear portion of the main body 19 of the plug has attached thereto a tail piece 69, which may comprise, for example, a tubular sleeve or the like extending longitudinally from the main body 19 of the plug. The tail piece preferably includes a bore for telescoping over the leading end of the new pipe 23, and means such as, for example, a transversely extending bolt 71 for securing the leading end of the new pipe 23 to the tail piece 69. The OD of the main body 19 of the plug 13 is preferably about the same as that at the greatest extent of the conical nose piece 17, in order to prevent the pipe shards or fragments 73 (FIG. 3) or other debris which has been expanded outwardly by the expanding means 13 from collapsing inwardly before the new pipe 23 can be pulled into place.

When the pulling means 25 is actuated to pull the crushing plug 5 along the pathway of the existing pipe, the knuckles 57 sequentially engage and fracture the bell joints 11, and the blades 53 engage the OD surfaces of the conduit sections 9, crushing the pipe entirely inwardly to destroy it. The movement of the crushing tool 5 along the pipe is effected without substantial rotation of the crushing tool. The expanding plug may be rotatably connected to the rear end of the crushing tool, thereby permitting the expanding plug with new pipe attached to be rotated prior to, or even during, installation.

Like the crushing tool of the present invention, the expanding plug is preferably made substantially entirely of steel or the like.

As the shards or fragments 73 of the old, imploded pipe traverse the interior 45 of the crushing tool 5 from front t rear between the blades 53, they may tend to become mixed with soil or other debris which has been cut by the crushing tool as it moves along the existing pipe or which has accumulated in the interior of the existing pipe. The knuckles 57 on the ID 45 of the crushing tool and the tabs 65 at the rear edges of the blades 53 may assist in this mixing action, thus helping to obtain a more uniform character of the material discharged from the rear end of the crushing tool. The uniformity of the discharged material may be of some assistance in the expanding operation. Since the material discharged from the crushing tool 5 will be for the most part loose pipe shards, dirt, and debris, the material will, in most cases, tend to fall by gravity toward the bottom of the crushing tool and expanding plug, as shown, for example, in FIG. 3, and thus will not be uniformly spread around the circumference of the expanding plug 13 when the expanding plug passes by. Thus, the shards and other debris 73 will not be uniformly spread around the circumference of the new pipe when installed. Since the material discharged from the with, i.e., more or less concentrated toward one side of the expanding plug, non-uniformity of discharged material may tend to hamper easy passage of the expanding plug, for example by increasing friction against the surfaces engaged by the plug.

The present invention may be used to crush or implode in situ and replace frangible underground pipes, that is, those pipes which may be fractured into irregular shards or fragments by the action of the crushing tool of the present invention. Such pipes may be made of materials such as concrete, tile, vitrified clay (VC), or cast iron, and include pipes known in the art as truss pipe and soil pipe. The present invention may also be used to replace PVC sewer pipe.

In addition, the present invention may even be used to pull ductile pipe, which is not frangible under normal conditions, from the ground to enable replacement of a new pipe with no resulting shards or other debris remaining in the hole. In the latter case, the crushing tool 5 simply engages an end of the existing pipe 7 and the pulling force applied by the winch or hydraulic boring system 25 disposed at the other end of the existing pipe forces the pipe along its axis to exit from the bore at the location of the pulling means.

The present invention will typically be used to replace frangible pipe of the types referred to herein, but may be found useful to replace other types of pipes in accordance with the broader teachings of the disclosure. The replacement pipe will typically be PVC pipe or the like because of its strength, durability, resistance to corrosion, ease of connecting together (as by bonding), and relative flexibility, as well as other desirable properties, but of course other types of replacement pipes will no doubt be found useful.

Figure 3:
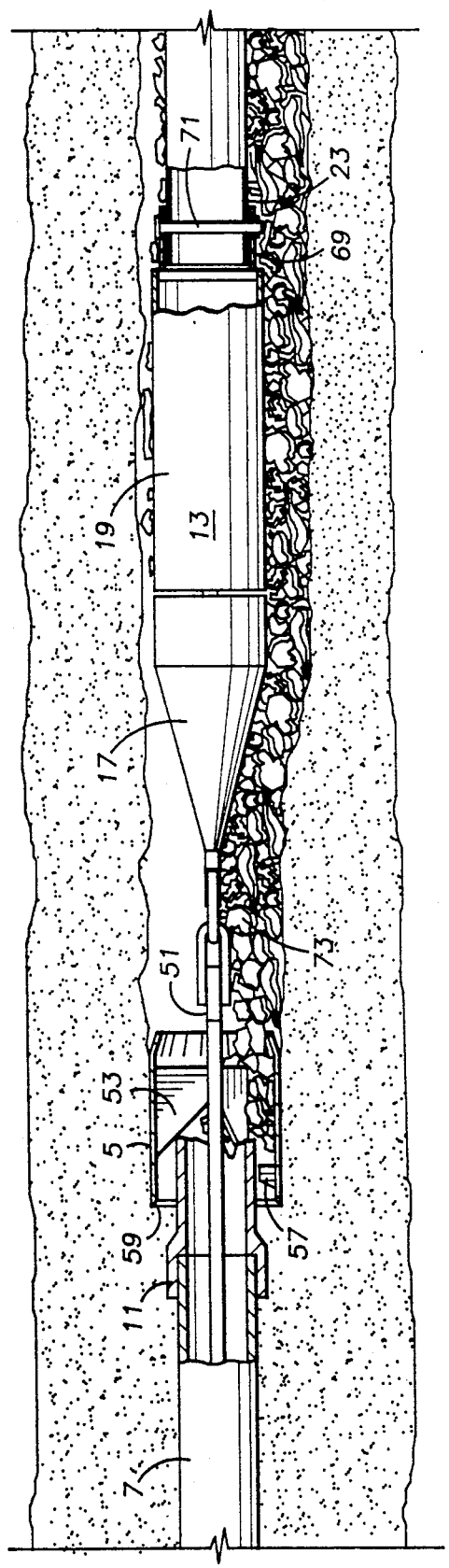
FIG. 3 is a view partly in section and partly in elevation, with some parts broken away, of the crushing tool and expanding plug of FIGS. 1 and 2 in operation, i.e., being pulled along an existing concrete pipe, crushing the existing pipe and forcing the shards into the surrounding earth, leaving a new pipe disposed in the bore created by the expanding plug.

FIG. 3 shows the crushing tool 5 and the expanding plug 13 of the present invention in operation. As can be seen from this figure, the blades 53 of the crushing tool 5 engage the existing pipe 7 and fracture it inwardly, or implode it. The fragments or shards 73 are maintained inside of the crushing tool 5 until they traverse the crushing tool body 43, whereupon the shards exit the tool 5 and tend to fall by gravity toward the bottom of the bore in the short space between the crushing tool and the expanding plug. The expanding plug is shown being pulled through th ground behind the crushing tool, whereupon the shards are forced outwardly by the plug a sufficient distance to form a bore of such size as will accommodate the new pipe 23.

In FIG. 5, the new pipe 23 is shown in place in the bore formed by the expanding plug 13. The new pipe 23 thus restores the fluid-carrying capacity intended for the old pipe, and also restores the fluid-carrying integrity of the pipe. It should also be understood that if desired, a new pipe of smaller ID than the old pipe can be installed, depending simply upon whether it can be affixed to the size of tail piece 69 with which the plug 13 is fitted.

The ID of the crushing tool can be virtually any size, within reason, as long as that ID is larger than the OD of the existing pipe, including flanges, bells and other raised features. That is to ensure that the pipe fragments are maintained inside of the crushing tool until they are forced to exit it through the rear. In general, replacing a sewer pipe having an 8" ID and an OD of about 10" would have bells having about a 12" OD. That would require a crushing tool having an ID of approximately $13\frac{1}{2}"$ to 14".

Although the foregoing describes preferred embodiments of the invention, the examples set out in the preceding description are for illustrative purposes only, and are not intended to be limiting. One skilled in the art will no doubt discover that modifications to the particular apparatus disclosed herein may be made without departing from the spirit of the invention. Accordingly, the scope of the present invention should only be determined through consideration and construction of the following claims.

I claim:

1. Apparatus for replacing an existing, frangible underground pipe disposed in a borehole with a new pipe as large as, or larger than, the existing pipe, comprising:
   a crushing tool including a tubular main body having a leading end, a trailing end, and a bore with an inner diameter larger than the outer diameter of the existing pipe, an end of the existing pipe being received within said bore from said leading end of said main body;
   crushing means disposed within said bore of said main body for engaging the outer surface of the existing pipe and crushing the existing pipe entirely inwardly into shards as the main body is forced along the exterior surface of the existing pipe;
   expanding means attached to said trailing end of said main body for forcing the shards of the crushed pipe outwardly into the surrounding soil and expanding the borehole previously occupied by the crushed pipe sufficiently to accommodate a replacement pipe as large as, or larger than, the existing pipe; and
   means for forcing said main body of said crushing tool along the exterior surface of the existing pipe.

2. Apparatus according to claim 1, wherein said expanding means is pulled through the borehole as said crushing tool is forced along the exterior surface of the existing pipe.

3. Apparatus according to claim 2, and further including attachment means disposed on said expanding means for attaching an end of the new pipe to said expanding means, the new pipe being pulled into the expanded borehole as the expanding means is pulled therethrough.

4. Apparatus according to claim 1, wherein said crushing tool bore has a wall, and said crushing tool includes a connecting rod disposed along the central axis of the tubular main body, and said crushing means includes a plurality of longitudinally extending, circumferentially spaced apart blades disposed between said connecting rod and said bore wall.

5. Apparatus according to claim 4, wherein said crushing means further includes a plurality of circumferentially spaced apart, radially extending knuckles disposed on said bore wall of said main body.

6. Apparatus according to claim 5, wherein said knuckles extend radially inwardly a distance sufficient to engage raised flange fittings of the existing pipe, but not sufficient to engage the outer surface of the existing pipe between flanges.

7. Apparatus according to claim 5, wherein said knuckles are disposed in circumferentially alternating relation with respect to said blades.

8. Apparatus according to claim 4, wherein said blades each have a tapered, leading, pipe engaging edge.

9. Apparatus according to claim 8, wherein said tapered blades taper from said connecting rod near the midportion of said tubular body to said bore wall and forwardly of said main body.

10. Apparatus according to claim 1, wherein said leading end of said main body has a relatively sharp, tapered edge.

11. Apparatus according to claim 1, wherein the trailing end of said tubular main body tapers inwardly and rearwardly.

12. Apparatus according to claim 1, wherein said expanding means is rotatably attached to said trailing end of said main body by a swivel connection.

13. Apparatus according to claim 4, wherein said connecting rod has a leading end and a trailing end, and includes threaded connecting means on its leading end for connecting said crushing tool to one end of a rod string, said rod string being connected at its other end to said means for forcing said main body of said crushing tool along the exterior surface of the existing pipe.

14. Apparatus according to claim 13, wherein said other end of said rod string is connected to a hydraulic boring system.

15. Apparatus according to claim 4, wherein said connecting rod has a leading and a trailing end, and includes connecting means on its leading end for connecting said crushing tool to a winch.

16. Apparatus according to claim 1, wherein said expanding means has a frustoconical-shaped nose portion comprising an expanding face, and a cylindrical body portion disposed rearwardly of said nose portion, said cylindrical body portion having an outer diameter at least as great as the greater outer diameter of said nose portion, said outer diameters of said nose portion and said cylindrical body portion being at least as great as the outer diameter of the new pipe.

17. A method for replacing an existing, frangible underground pipe disposed in a borehole with a new pipe as large as, or larger than, the existing pipe, comprising:
   placing an end of the existing pipe within the bore of a crushing tool from the leading end of said crushing tool;
   engaging the outer surface of the existing pipe with a crushing means disposed within said bore of said crushing tool and crushing the existing pipe entirely inwardly into shards as the crushing tool is forced along the exterior surface of the existing pipe;
   causing the shards of the crushed pipe to move outwardly into the surrounding soil and expanding the bore hole previously occupied by the crushing pipe sufficiently to accommodate a replacement pipe as large as, or larger than, the existing pipe; and
   forcing said crushing tool along the exterior surface of the existing pipe.

18. A method according to claim 17, wherein the movement of the shards outwardly and the expanding of the borehole occur in trailing fashion as said crushing tool is forced along the exterior surface of the existing pipe.

19. A method according to claim 18, including the additional step of pulling the new pipe into the expanded borehole in trailing fashion as the borehole is expanded.

* * * * *